United States Patent [19]
Hench, Sr. et al.

[11] 3,951,245
[45] Apr. 20, 1976

[54] NOISE SUPPRESSOR FOR A GRANULATING MACHINE

[75] Inventors: Hans Hench, Sr.; Friedrich Hunke, both of Grossostheim; Kurt Pohan, Freigericht, all of Germany

[73] Assignee: Automatik Apparate-Maschinenbau Hans Hench GmbH, Grossostheim, Germany

[22] Filed: Aug. 5, 1974

[21] Appl. No.: 494,493

[30] Foreign Application Priority Data
Aug. 10, 1973 Germany............................ 2340682

[52] U.S. Cl............................... 193/32; 181/33 K; 193/29; 241/222
[51] Int. Cl.²....................................... B65G 11/20
[58] Field of Search................. 193/1, 10, 25 C, 27, 193/28, 32, 25 R, 25 A; 181/33 C, 33 K, 33 L, 33 P, 33 Q, 64; 241/100, 186 R, 189 R, 222, 224, 227, 286 R, 301

[56] References Cited
UNITED STATES PATENTS

| | | | |
|---|---|---|---|
| 260,104 | 6/1882 | Lidford | 193/32 X |
| 437,087 | 9/1890 | Buchholz | 241/224 |
| 864,408 | 8/1907 | Campbell | 193/25 A |
| 1,155,942 | 10/1915 | Mason | 193/32 |
| 1,356,189 | 10/1920 | Castets | 181/64 R |
| 1,534,855 | 4/1925 | Lowenthal | 241/224 X |
| 2,546,733 | 3/1951 | Enestvedt | 193/32 X |
| 2,950,776 | 8/1960 | Stephens | 181/64 R X |
| 3,121,469 | 2/1964 | Schelf | 181/64 R |
| 3,643,880 | 2/1972 | Peterson | 241/301 X |
| 3,837,586 | 9/1974 | Perschbacher | 241/227 X |

FOREIGN PATENTS OR APPLICATIONS
653,868 11/1937 Germany ............................ 193/32

*Primary Examiner*—John J. Love
*Assistant Examiner*—James Rowland
*Attorney, Agent, or Firm*—Wolfgang G. Fasse; Willard W. Roberts

[57] ABSTRACT

This noise reducing device is arranged in the discharge chute of a material granulating apparatus in which a rapidly rotating knife cuts strips or strands of material into granules. In one embodiment of the device a wing wheel or impeller type of wheel is supported off-center for rotation in a portion of substantially cylindrical cross section of the chute. In another embodiment, angularly arranged plates are positioned substantially oppositely each other in the discharge chute to deflect the granular material so as to follow a zig-zag path.

3 Claims, 2 Drawing Figures

NOISE SUPPRESSOR FOR A GRANULATING MACHINE

BACKGROUND OF THE INVENTION

The invention relates to a noise reducing device for a granulating apparatus. The device is arranged at the output end of the granulating apparatus for the purpose of absorbing or suppressing the noise resulting from the operation of the granulating apparatus. Such an apparatus is described in detail in copending application Ser. No. 311,386, filed Dec. 1, 1972 assigned to the same assignee. The copending application is now allowed.

In a granulating apparatus as described in said copending application, substantial noise may be generated by the cutting operation, depending on the type of material to be granulated, especially where synthetic strands are to be granulated, a siren type of noise is created. Such a noise is undesirable, since it influences the operating personnel in a negative manner.

OBJECTS OF THE INVENTION

In view of the above it is the aim of the invention, to achieve the following objects, singly or in combination:
to reduce or even eliminate as much as possible the noise generated in a granulating machine;
to employ a guide means for the granulated material in the discharge chute of the granulating apparatus in such a manner that a controlled material accumulation will act as a noise absorbing buffer;
to provide means which will substantially close the discharge chute against the propagation of noise without negatively influencing the discharge function of the chute; and
to cover the chute walls as well as granular material deflection plates with noise absorbing material at least on one surface thereof.

SUMMARY OF THE INVENTION

According to the invention there is provided a noise reducing device for a granulating apparatus having a discharge chute for the granular material. Flow direction deviating means are arranged in the discharge chute in such a manner that the material flow is deflected away from a linear path, preferably to follow a curved or zig-zag path.

Since the discharge chute of the granulating apparatus is closed all around, except at its beginning, where it is connected to the granulating apparatus and at its discharge end, the noise can be conducted substantially only in the longitudinal direction of the discharge chute. The invention has effectively stopped the noise propagation along the length of the chute because the deviating means, according to the invention, permit on the one hand a satisfactory material feed advance, while simultaneously substantially stopping the noise propagation, whereby, for example, a certain material level in the chute may itself form a noise absorbing buffer zone.

According to one embodiment of the invention, the material deviating means include a wing wheel or impeller type of wheel rotatable in the chute, preferably in a respective chamber portion of the chute. The diameter of the wheel is such, that by locating the wheel somewhat off-center in the chamber, a passage is formed between the bottom surface of the chamber and the downwardly reaching wing tips of the wheel, while the upwardly reaching wing tips of the wheel snugly pass along the top surface of the chamber. The passage has a height or width corresponding substantially to the size of the granules. The bottom surface of the passage is downwardly inclined. The wing wheel or impeller type of wheel is driven with such a speed relative to the material flow that a certain quantity of granular material is accumulated upstream of the wheel to maintain a certain material level which effectively absorbs the noise created by the cutting operation as far as propagation through said passage is concerned, whereas the snugly passing wheel wings effectively impede the noise propagation along the top surface of the chute.

In another embodiment, deflection plates are arranged in the chute, preferably at an angle relative to the chute walls. The ends of the deflection plates overlap each other but with a gap between adjacent plates so that a zig-zag path of the granular material is accomplished. Preferably, at least one side of these deflection plates is covered with a noise absorbing material, such as foam rubber or cork, whereby the surface of the plate is covered with said material which is not impinged by the granules. The plates reaching into the chute constitute successive barriers for the noise waves travelling along the chute, whereby these noise waves are substantially absorbed.

BRIEF FIGURE DESCRIPTION

In order that the invention may be clearly understood, it will now be described, by way of example, with reference to the accompanying drawings, wherein:

FIG. 1 illustrates a sectional view of one embodiment of the invention comprising a wing wheel or impeller type of wheel; and FIG. 2 illustrates an embodiment comprising deflection plates in the material discharge chute.

DETAILED DESCRIPTION OF EXAMPLE EMBODIMENTS:

Figure 1:
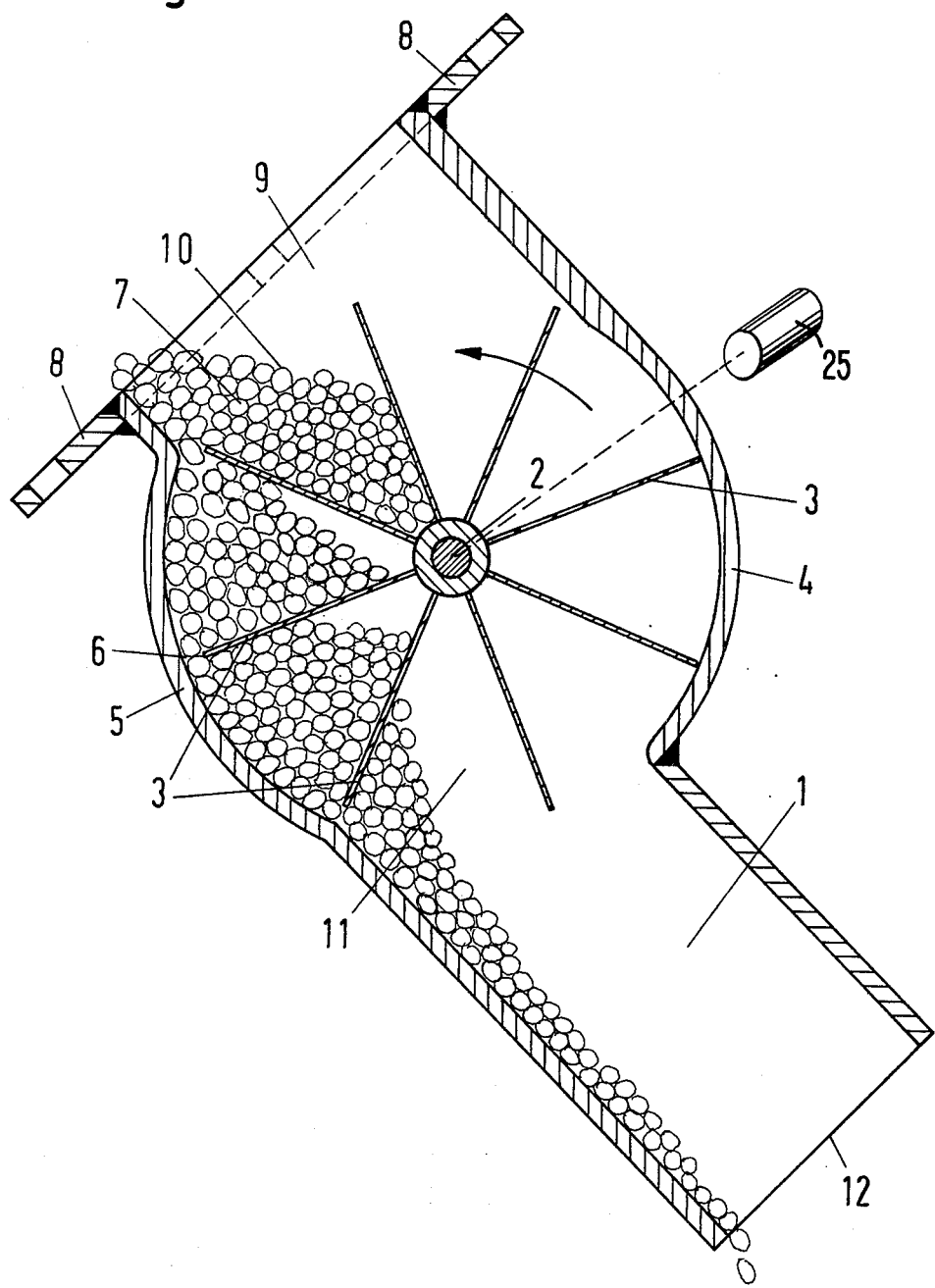

FIG. 1 illustrates a sectional view through a discharge chute 1 for granular material 7 coming from a granulating apparatus, as for example described in U.S. Ser. No. 311,386. The section through the entire illustration of FIG. 1 extends perpendicularly to the axis 2 of a wing wheel 3 and thus radially along the wings of said wheel. The upper end of the chute is provided with a flange 8 which may be secured to the granulating apparatus. Adjacent to the upper end of the chute there is provided a substantially cylindrical chamber having a respectively curved upper wall 4 and a lower wall 5. The wings of the wing wheel 3 have all the same radial length.

The wing wheel 3 is supported for rotation in the side walls of the substantially cylindrical chamber formed by the walls 4 and 5. The wing wheel 3 is driven by drive means such as motors 25 operatively connected to a shaft end of shaft 2 extending out of the chute 1. The wing wheel is driven in the direction of the arrow shown in FIG. 1.

The wing wheel 3 is supported in the substantially cylindrical chamber somewhat off-center so that the tips of the wheel wings pass substantially without clearance snugly along the inner surface of the wall portion 4, while passing along the inner surface of the wall portion 5 with clearance, so as to leave a channel 6. The same construction could be achieved by giving the chamber a respective shape which is not truly cylindrical. In any event, the passage or channel 6 will have a height substantially corresponding to the size of the granular material 7. The length of the curved wall 4 is preferably such relative to the angular spacing between adjacent wheel wings that at least two wheel wings will pass along the inner surface of the wall 4, thus effectively closing the upper portion of the chute against the propagation of noise.

Depending on the quantity of granular material, coming from the granulating apparatus, the wing wheel 3 is driven with such a speed that a quantity of the granular material 7 accumulates at the entrance end 9 of chute 1 to maintain a level 10 of granular material. Thus, the level 10 will be higher if the material is supplied faster or lower if the wheel rotates faster. The granular material fills the chambers between adjacent wheel wings and is moved along with the rotation of the wing wheel until it eventually clears the inner surface of the wall portion 5. Thus, as shown, the granular material easily falls out of the chamber 11 and slides down the inclined chute toward its exit end 12. The granular material easily follows the movement of the wing wheel since it is also subject to the influence of gravity and the entire lower surface, including the surface of the wall section 5, is downwardly inclined from the input end 9 to the output end 12 of the chute 1. By providing especially the surface of the wall portion 5 with a downward inclination, any jamming of the granular material is avoided.

The sound waves entering at the input end 9 of the chute 1 impinge upon the wings of the wing wheel 3 and upon the granular material 7 whereby the direct propagation of the sound waves toward the output end 12 of the chute 1 is substantially interrupted. The sound waves are substantially absorbed by impinging upon the wings of the wheel 3 and upon the granular material. No slots are provided for the passage of noise because, as mentioned, the upper tips of the wings of the wheel 3 snugly pass along the inner surface of the wall portion 4 and because the passage or channel 6 is filled with granular material. Further, the axial length of the wheel corresponds to the inner length of the chamber so that lateral slots are also avoided whereby the propagation of sound waves is also effectively prevented along the lateral side walls of the chute.

Figure 2:
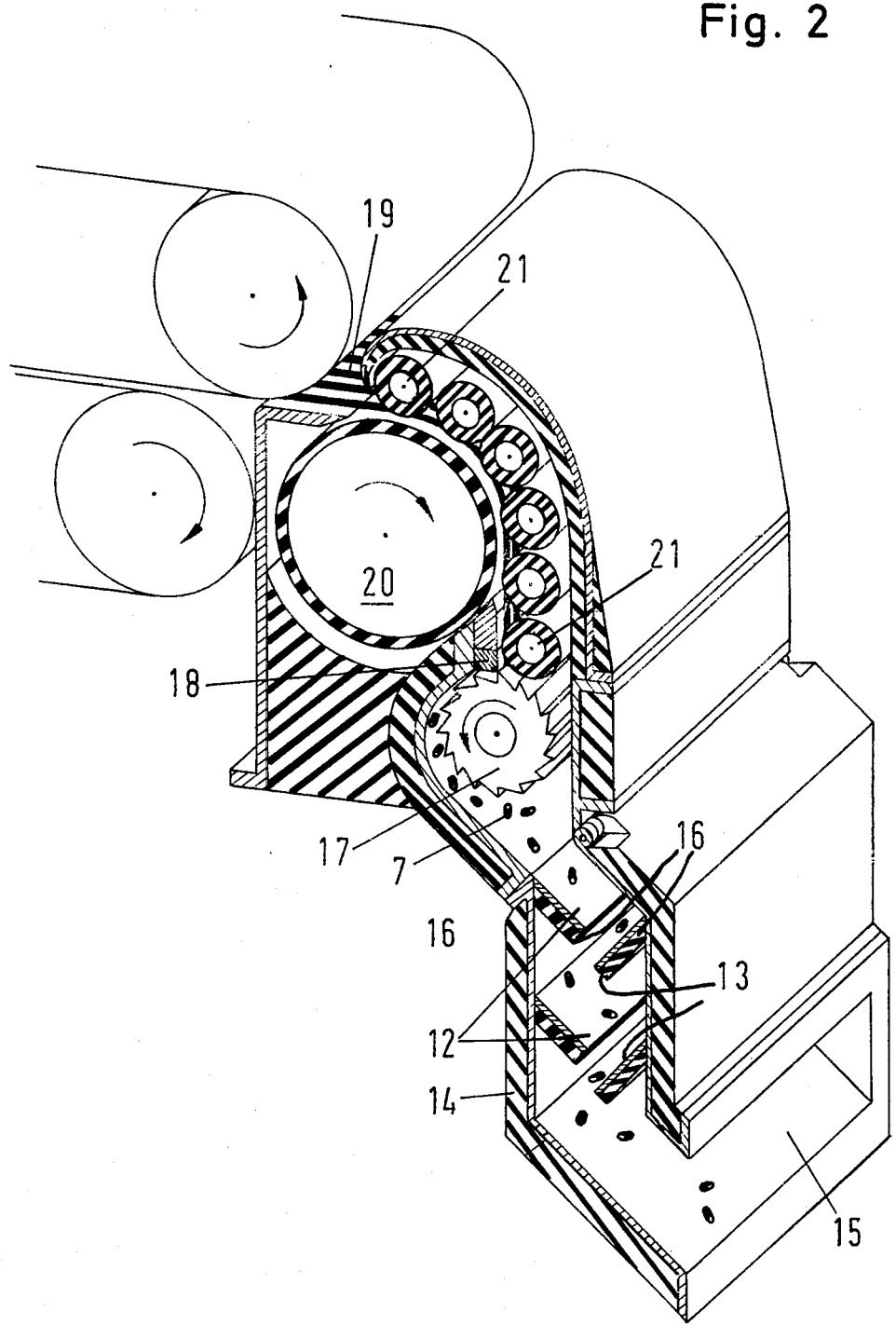

FIG. 2 illustrates an embodiment, wherein the flow deviating means comprise flow deflection plates 12 and 13 which reach into the chute 14. The plates 12 and 13 are preferably arranged at an angle relative to the walls forming the chute. Further, the inwardly facing edges of the plates 12 and 13 overlap each other, so that gaps are formed between these plates whereby the granular material is forced to follow a zig-zag path.

FIG. 2 illustrates in addition to the chute 14 a granulating apparatus having a rotary cutter cylinder 17 cooperating with a counter knife or edge 18. These cutting tools granulate the strands 19 which are supplied to the cutting tools by means of the transport cylinder 20 and the pressure rollers 21. It will be appreciated that the illustrated granulating apparatus is merely an example which, incidentally, could also be used in combination with the chute of FIG. 1. If desired, the walls and the housing of the granulating apparatus could be provided with noise absorbing material as illustrated in FIG. 2. Similarly, the walls of the chute may also be covered with noise absorbing material, such as cork or a synthetic foam material.

The granular material 7 entering into the chute 14 follow a zig-zag path as determined by the deflection plates 12 and 13 and thus reach the exit end 15 of the chute 14 without any jamming inside the chute. However, noise waves emanating from the operation of the cutter 17 impinge upon the plates 12 and 13 whereby they are reflected several times in the chute 14 whereby they also reach the noise absorbing coverings 16 on the lower surfaces of the deflection plates 12 and 13 which absorb these reflected noise waves whereby their intensity at the output end 15 of the chute 14 is substantially reduced. The sectional view through the prespective illustration of FIG. 2 clearly shows the above described material flow as well as the repeated impinging of noise waves on the deflection plates.

Although the invention has been described with reference to specific example embodiments, it will be appreciated that it is intended to cover all modifications and equivalents within the scope of the appended claims.

What is claimed is:

1. A noise reducing device for a granulating apparatus comprising a substantially closed discharge chute adapted to be secured to an output end of said granulating apparatus and flow direction deviating means located in said discharge chute for deviating the flow of granular material from a straight path, said discharge chute comprising a substantially cylindrical chamber at its upper end, said flow direction deviating means comprising a wing wheel having a horizontal axis supported for rotation in said chamber, said wing wheel being located off center in said chamber sufficiently to leave a passage for the granular material between the tips of the wheel wings and the bottom of said chamber, and so that the tips of said wheel pass the top surface of the chamber substantially without clearance, said passage having a height corresponding substantially to the size of the granular material, said passage having a downward inclination in the direction of material flow, and means for driving said wing wheel in a direction to move the granular material downwardly along said passage and with such a speed that a level of granular material is maintained upstream of said wing wheel as viewed in the direction of material flow, whereby said granular material continually blocks direct sound wave propagation through said passage.

2. The device according to claim 1, wherein said wing wheel has a plurality of wings angularly spaced about said horizontal axis, said chamber having a curved top wall with such a length relative to the spacing between adjacent wings on said wing wheel that at least two wings pass simultaneously along said curved top wall when the wing wheel rotates.

3. A noise reducing device for a granulating apparatus, comprising a substantially closed discharge chute adapted to be secured to an output end of said granulating apparatus, said discharge chute comprising a chamber having an inlet in one portion of its upper wall and an outlet in one portion of its lower wall, a curved upper wall portion adjacent said inlet and a curved lower wall portion between said inlet and said outlet, whereby said curved lower wall portion is downwardly inclined from said inlet to said outlet, a winged wheel supported for rotation on a horizontal axis in said chamber between said curved upper and lower wall portions, said winged wheel having a plurality of radially extending wings and being positioned with the tips of said wings passing said upper wall portion substantially without clearance at least at one point along said upper wall portion, and wherein the tips of said wings are spaced from said lower wall portion to define a passage having a height corresponding substantially to the size of granular material from said granulating apparatus, and means for rotating said winged wheel with such a speed as to continually maintain a level of said granular material upstream of said wing wheel as viewed in the direction of material flow, whereby said granular material continually blocks direct noise propagation through said passage.

* * * * *